Patented Feb. 18, 1936

2,030,887

UNITED STATES PATENT OFFICE 2,030,887

METHOD OF MAKING SODIUM AND ZINC SULPHIDES

Thomas A. Mitchell, Inglewood, and Royal L. Sessions, Los Angeles, Calif., assignors, by mesne assignments, to Hughes-Mitchell Processes, Incorporated, Denver, Colo., a corporation of Wyoming No Drawing. Application June 11, 1931, Serial No. 543,734. Renewed April 19, 1935

6 Claims. (Cl. 23—135)

This invention relates to the manufacture of metal sulphides and more particularly to the production of sodium sulphide and of zinc sulphide.

Zinc sulphide has been made heretofore by precipitation of a zinc chloride solution through the agency of sodium sulphide. Sodium sulphide has ordinarily been made by the direct reduction of salt cake (sodium sulphate) by furnacing the same with coal in a suitable muffle. The product has had various impurities, one of which contains iron and is supposed to be a double sulphide of iron and sodium. It is found that the iron and other metal sulphides which contaminate such a solution of sodium sulphide remain with the zinc sulphide pigment in their various colors and give the pigment a yellow appearance which is highly objectionable. They may also aid in the darkening action which takes place in an impure zinc sulphide pigment under the action of the ultraviolet rays of the sunlight. It is therefore highly desirable to eliminate such impurities from the sodium and zinc sulphides. There has however been no satisfactory way of removing such impurities as iron from the sodium sulphide solution extracted from the reduced salt cake except by a process involving recrystallization, which is laborious, expensive and not wholly satisfactory.

One object of this invention therefore contemplates the production of sodium sulphide which is free from iron compounds and which is otherwise suitable for use in the precipitation of zinc sulphide commonly employed as a pigment.

It is a further object of this invention to provide a method of making zinc sulphide which will be economical and simple in its procedure and which will result in a high grade product well adapted for use as a pigment.

This invention contemplates further objects, as will be apparent from the following disclosure, which relate to improving the process of making sodium and zinc sulphides, and especially a pigment free from zinc oxide and adsorbed chlorides which will have great resistance to the darkening action of light as well as a satisfactory color and hiding power.

In accordance with our invention we propose to manufacture sodium sulphide from salt cake by a method which effectively eliminates iron from the final product, as well as various other detrimental impurities. This process comprises essentially the purification of a sodium sulphate solution, or one derived from salt cake, in order to eliminate iron, manganese, arsenic and other undesired ingredients and then to treat the solution with purified barium sulphide in order to precipitate barium sulphate and leave a solution of sodium sulphide free from compounds of the heavy metals. This barium sulphate, known as blanc fixe, is available for reduction to barium sulphide or for use as otherwise desired in the industry.

While the barium sulphide may be derived from other sources, it is preferred to obtain the same by reducing barium sulphate by furnacing it in the standard manner, which is accomplished by heating it mixed with the proper amount of carbonaceous material, such as coal. The furnace product, which is known as black ash, is quenched in water upon withdrawal from the furnace and the barium sulphide is separated from the gangue by solution in water and filtration or as otherwise desired. This crude barium sulphide solution may be purified in accordance with standard methods, and the iron and manganese in particular should be removed in order not to contaminate the sodium sulphide. For example, the solution may be de-colorized by use of a solid oxidizing agent, such as manganese dioxide, and then filtered through calcium carbonate.

It is found that when barium sulphide is dissolved in water it tends to hydrolyze in accordance with the following equation:

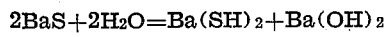

$$2BaS + 2H_2O = Ba(SH)_2 + Ba(OH)_2$$

in accordance with which barium is equally divided between the barium sulphydrate and the barium hydrate. However, the solution derived from black ash ordinarily contains an excess of barium hydrate or hydroxyl ion over that shown in the above equation, owing to various oxidizing conditions involved in the process of manufacture. This excess of barium hydrate, if permitted to remain, will ultimately result in the precipitation of zinc hydrate during the formation of the pigment and so lead to the production of the objectionable zinc oxide when the material is muffled. We avoid this formation of zinc oxide in one of two ways. According to one method, we may remove this excess barium hydrate from the barium sulphide solution by neutralization with a suitable agent, such as hydrochloric acid, the amount of which is calculated in accordance with an analysis of the barium sulphide solution. This step may be omitted however, and the excess of hydroxyl ion may be removed from the sodium sulphide solution, in accordance with our second method explained below.

The production of the purified sodium sulphate solution may be accomplished in the following manner: The unpurified but preferably concentrated solution of sodium sulphate or salt cake is placed in a wooden tank equipped with wooden stirring apparatus, it being noted that the use of iron apparatus is objectionable since the sodium sulphide tends to attack it and form iron sulphide. This bath is heated to about 70° C., which may be accomplished by means of super-heated steam introduced through the medium of a rubber hose pipe. Then the iron and manganese are oxidized and precipitated by the use of a sufficient amount of bleaching powder, as will be understood. After this, the solution is filtered from the iron sludge and other impurities thus precipitated by passing it through a wooden filter press. The purified solution of sodium sulphate is preferably received in a zinc lined wooden tank equipped with zinc coated wooden stirring apparatus and zinc coated heating coils. Any contamination with zinc is not objectionable owing to the ultimate use of the sodium sulphide solution for the precipitation of zinc sulphide.

Having thus prepared and purified the two solutions of sodium sulphate and barium sulphide, the formation of sodium sulphide will now be accomplished by slowly adding the required amount of barium sulphide solution to the sodium sulphate in the zinc lined tank, thus precipitating barium sulphate. The temperature of the bath should be kept at approximately 80° C. in order to insure proper granulation of the barium sulphate so that it may be satisfactorily filtered. The barium sulphide is introduced until all of the sodium sulphate has been converted to sodium sulphide and barium sulphate. Then the solution of sodium sulphide is removed from the precipitate in a filter press without washing or dilution with water. The pressed cake of barium sulphate is thereafter thoroughly washed with water for subsequent use, while the purified solution of sodium sulphide is received in a zinc lined wooden tank.

If there was an excess of barium hydrate in the barium sulphide solution and it was not preliminarily neutralized by hydrochloric acid, the purified sodium sulphide solution may be contaminated with a small amount of sodium hydrate. This is objectionable because the alkali will subsequently produce zinc hydroxide with the ultimate formation of zinc oxide on the muffled pigment. Accordingly, we neutralize this sodium hydrate by the use of hydrochloric acid. The control of the operation may be accomplished in any appropriate laboratory manner. After such neutralization, the sodium sulphide, being free from the heavy metal impurities and alkalies, is suitable for the precipitation of zinc sulphide. The presence of the chloride ion is not objectionable, since the subsequent steps of the process remove it from association with the pigment particle.

It will now be understood that this sodium sulphide solution may be evaporated and sodium sulphide recovered therefrom for any commercial use to which it may be adapted. It will also be observed that we have done away with the expensive method of re-crystallizing a sodium sulphide solution in order to remove iron and other impurities and that there are many economic advantages in our production of sodium sulphide in this manner. If, for example, the sodium sulphate to be employed exists in the form of a solution, then it is not necessary to evaporate it with its incident costs and difficulties so as to have the anhydrous salt available for reduction with coal in the regular manner. In accordance with our invention, this solution may be purified by the methods above specified and treated directly with barium sulphide to form the purified sodium sulphide. It will also be observed that we have produced barium sulphate along with this sodium sulphide and that this barium sulphate is a marketable product which may be sold and thus indirectly reduce the cost of producing the sodium sulphide. In order to make the process cyclic, we propose to reduce this barium sulphate by means of coal or other suitable reducing agent in a suitable furnacing operation and thereby to reform barium sulphide for use in the process.

A further feature of our invention involves the production of zinc sulphide by treating a zinc salt solution with the sodium sulphide as obtained in accordance with the above described procedure. The zinc salt may be zinc sulphate or zinc chloride, and preferably the latter since this process is particularly adapted for the elimination of any chloride adsorbed on the zinc sulphide particle. The zinc salt solution will have been first purified from objectionable metal salts which tend to produce colored pigments; but harmless or helpful ingredients may be left in the zinc chloride if desired.

The formation of zinc sulphide will be accomplished by introducing the sodium sulphide solution into a solution of zinc chloride or zinc sulphate. It is not necessary that there be any particular strength of solution, but there should be a slight excess of the precipitating agent to insure that all of the zinc is brought out of solution. While various other strengths may be employed, we find it satisfactory to use a 50° Bé. zinc chloride solution and a 14° Bé. sodium sulphide solution. The precipitation is carried on in a cold solution or one having a temperature below the boiling point, such as 70° C. As a result of this process we now have zinc sulphide pulp and a solution of sodium chloride or sodium sulphate, as the case may be.

Instead of washing the pulp as has been the practice heretofore, we directly filter the solution from the pulp and do not find that any adsorption of solution on the zinc sulphide particle is detrimental because of the steps later taken to eliminate the objectionable material. In particular, if the solution is sodium chloride and there is some of it adsorbed on the zinc sulphide, it may be easily removed. As soon as the pulp has been filtered, the precipitate is repulped in water as soon as possible while the salt solution is removed for other uses. The precipitate is now permitted to settle and is then de-canted.

Our special treatment for removing the chloride ion involves treating the pulp with a material which will leave the chloride ion in such a compound that it may be volatilized during the subsequent muffling of the zinc sulphide when the latter is heated to remove the water of hydration. For example, by treating the zinc sulphide pulp with a slight amount of sulphuric acid or ammonium sulphate, we produce either hydrochloric acid or ammonium chloride together with sodium sulphate. The sulphuric acid or the ammonium sulphate is of course introduced in proper amount to insure the complete elimination of the chloride which has been adsorbed thereon, the pulp being preferably given an acid reaction.

Thereafter the pulp is filtered and muffled directly or after it has been dried to 10 or 15% moisture content. This muffling procedure may be carried on by heating the material to a desired temperature, and, in the presence of steam or inert gases. We may use 1 or 2% of carbon monoxide or carbon dioxide. The temperature range may be between 650 and 750° C., the precise temperature depending upon the requirements to be met in the finished product. This heating operation therefore serves two purposes, the removal of the water of hydration and the elimination of any chloride which may have been present with the pulp. The hydrochloric acid or ammonium chloride formed will go into the muffle atmosphere and ultimately escape, while the slight amount of sodium or zinc sulphate present will be washed out at a later stage.

After the material has been satisfactorily heated to remove the water of hydration and the adsorbed material, it is ordinarily quenched by introduction into cold water. Then the zinc sulphide pulp is washed and wet ground in water to remove soluble salts and to produce a fine slurry so that the material may be readily conditioned and be given the property of dispersing easily in the oil in which it is to be incorporated as a paint pigment.

During these muffling and quenching operations, care is taken to avoid the introduction of an oxidizing agent which would form zinc oxide or oxychloride. There may however be a slight amount of either of such materials present. The removal of the last traces of the chloride ion as well as the zinc oxide may be accomplished by treating the slurry of zinc sulphide with a suitable material other than one containing the chloride ion, such as sulphuric acid, sodium hydrogen sulphate, aluminum sulphate, and titanium sulphate, which will dissolve the zinc oxide or oxychloride and thus remove it from the zinc sulphide particle. If the aluminum or titanium salt or similar materials are employed, this will result in the production of aluminum or titanium hydroxide which will presumably coat the zinc sulphide particles and serve as a protective medium. The amount of reagent to be added will be determined by analytical procedure, an excess of the neutralizing reagent being ordinarily desired. Following this treatment, the zinc sulphide may be washed to remove the soluble impurities, although an excessive washing is not required. Thereafter any slight acidity of the bath may be neutralized by the addition of sodium carbonate or hydrate.

From the outline of the process as set forth it will be seen that any zinc hydrate produced during the precipitation of zinc sulphide, or any zinc oxide produced during the muffling of zinc sulphide, may be removed during the so-called conditioning treatment, so that the discoloring effect of zinc oxide on zinc sulphide may be reduced to a minimum, standard amount. This does not means that carelessness is allowable either during the preparation of the precipitating solution or in muffling, but the conditioning treatment does produce a standard product to which may be given a dispersion treatment in producing a zinc sulphide pigment of uniform properties as regards its behavior towards the paint vehicle.

The zinc sulphide pigment is now in a neutral condition and ready for such further treatments as may be desired for making it disperse properly in oil. These may involve imparting a definite alkalinity to the pigment by adding a definite amount of an alkaline agent, such as barium hydrate. Or, we may treat the washed slurry with a solution of a water soluble soap such as the ordinary household stearate or resin soaps, which serves to coat the fine particles of zinc sulphide uniformly and to any degree desired. This latter method is accomplished preferably in a stirring apparatus where the materials are rapidly agitated so as to insure proper distribution of the soap on the zinc sulphide particles. After this dispersion treatment, the zinc sulphide pigment may be now given such further treatments as desired, and it will be dried, disintegrated and packed for shipment to the paint industry.

Having thus described our invention, what we claim as new and desire to secure by Letters Patent is:

1. The method of making sodium sulphide comprising the steps of purifying crude sodium sulphate in an alkaline aqueous solution to oxidize precipitate and remove iron and manganese therefrom, removing the excess of hydroxyl ion by means of hydrochloric acid and treating the resultant solution with iron-free barium sulphide to form sodium sulphide.

2. The method of making zinc sulphide pigment comprising the steps of oxidizing, precipitating and removing the iron and manganese from crude sodium sulphate in an alkaline aqueous solution, removing the excess of hydroxyl ion from the solution by means of hydrochloric acid, producing sodium sulphide by reaction of iron-free barium sulphide on said purified solution and treating a zinc chloride solution with the sodium sulphide to precipitate zinc sulphide which is substantially free from oxygen and iron compounds.

3. The method of claim 2 in which the chlorine ion introduced by the purification of the sodium sulphate solution is removed, together with chlorine derived from the zinc chloride, by treating the precipitated zinc sulphide particle with an agent which forms with the chlorine a compound capable of being readily removed in a subsequent calcining operation, and thereafter calcining the pigment.

4. The method of making zinc sulphide pigment by precipitation of zinc sulphide from a zinc chloride solution by means of sodium sulphide and a subsequent calcination thereof comprising the steps of removing iron and manganese from crude sodium sulphate in an alkaline aqueous solution, treating the solution with barium sulphide which is free from iron and manganese and forming sodium sulphide, treating the reagent solutions or the resultant sodium sulphide solution with hydrochloric acid to remove the excess of hydroxyl ion and prevent contamination of the zinc sulphide pigment therewith and, after the precipitation of the zinc sulphide, treating it with a reagent which forms with the residual chlorides a chlorine compound capable of volatilizing during the subsequent calcination of the pigment, thereby forming zinc sulphide which is substantially free from oxygen and chlorine compounds.

5. The method of making sodium sulphide comprising the steps of treating crude sodium sulphate in an alkaline aqueous solution to oxidize and precipitate any iron and manganese therein, treating the resultant solution with barium sulphide which is free from iron and manganese to precipitate barium sulphate and form sodium sulphide in solution, removing the barium sulphate precipitate without diluting the solution, and neutralizing the excess of hydroxyl ions in the reagent solutions or the resultant sodium sulphide solution by means of hydrochloric acid, thereby producing a sodium sulphide solution which is free from iron, manganese and hydroxyl ions.

6. The method of claim 5 in which the barium sulphate precipitate is reduced by heating it with carbon to form black ash containing barium sulphide and the sulphide is dissolved from the black ash and is used in a condition free from iron and manganese to treat a further amount of sodium sulphate solution, thereby providing a cyclic process requiring only a supply of crude sodium sulphate and in which the excess of hydroxyl ions in the barium sulphide solution dissolved from the black ash is neutralized.

THOMAS A. MITCHELL.
ROYAL L. SESSIONS.